(12) United States Patent
Hoffman (10) Patent No.: US 10,302,521 B2
(45) Date of Patent: May 28, 2019

(54) SYSTEM, METHOD, AND TOOL FOR LOCATING REFRIGERANT LEAKS IN AIR CONDITIONING SYSTEMS AND THE LIKE

(71) Applicant: Robert Dean Hoffman, Columbus, OH (US)

(72) Inventor: Robert Dean Hoffman, Columbus, OH (US)

( * ) Notice: Subject to any disclaimer, the term of this patent is extended or adjusted under 35 U.S.C. 154(b) by 0 days.

(21) Appl. No.: 15/796,998

(22) Filed: Oct. 30, 2017

(65) Prior Publication Data

US 2019/0128764 A1    May 2, 2019

(51) Int. Cl.
*G01M 3/04* (2006.01)
*F25B 45/00* (2006.01)
*F25B 1/00* (2006.01)

(52) U.S. Cl.
CPC .............. *G01M 3/04* (2013.01); *F25B 45/00* (2013.01); *F25B 1/00* (2013.01); *F25B 2500/222* (2013.01)

(58) Field of Classification Search
CPC ............ G01M 3/04; G01M 3/02; G01M 3/00; G01M 3/20; G01M 3/22; F25B 45/00; F25B 1/00; F25B 2500/222
See application file for complete search history.

(56) References Cited

U.S. PATENT DOCUMENTS

| | | | |
|---|---|---|---|
| 5,681,984 A | 10/1997 | Cavestri | |
| 6,647,761 B2 | 11/2003 | Barjesteh | |
| 6,978,636 B2 | 12/2005 | Motush et al. | |
| 7,022,993 B1 | 4/2006 | Williams, II et al. | |
| 7,296,423 B2* | 11/2007 | Appler | B60H 1/00585 62/114 |
| 8,418,530 B1 | 4/2013 | Scaringe et al. | |
| 8,695,404 B2 | 4/2014 | Kadle et al. | |
| 9,541,467 B2* | 1/2017 | McCollom | G01M 3/20 |
| 2005/0044930 A1* | 3/2005 | Finlay | G01M 3/025 73/40.7 |
| 2013/0192345 A1* | 8/2013 | Mateo | G01M 3/28 73/39 |
| 2015/0336047 A1* | 11/2015 | Billiet | B01J 20/18 95/91 |

* cited by examiner

*Primary Examiner* — David Z Huang
(74) *Attorney, Agent, or Firm* — Porter, Wright, Morris & Arthur, LLP (57) ABSTRACT

A tool connects a source of compressed air to a low pressure service port valve of a refrigerant system for pressurizing the refrigerant system with air to locate leaks. The tool includes a connector, an air pressure regulator having a control knob and a pressure gauge, and an air hose fitting having an inlet for removable attachment to an air hose of the air source and an outlet in communication with the air pressure regulator inlet. The connector outlet is configured for removable attachment to the low pressure service port valve for air flow from the connecter outlet into the low pressure service port valve. The air pressure regulator outlet is in air flow communication with the connector inlet. With the tool installed, the closed refrigerant system can be pressured with air to a desired air pressure so that leaks become apparent by compressed air escaping.

20 Claims, 9 Drawing Sheets

SYSTEM, METHOD, AND TOOL FOR LOCATING REFRIGERANT LEAKS IN AIR CONDITIONING SYSTEMS AND THE LIKE

CROSS-REFERENCE TO RELATED APPLICATIONS

Not applicable

STATEMENT REGARDING FEDERALLY SPONSORED RESEARCH

Not applicable

PARTIES TO A JOINT RESEARCH AGREEMENT

Not Applicable

REFERENCE TO APPENDIX

Not applicable

FIELD OF THE INVENTION

The field of the present invention generally relates to locating refrigerant leaks and, more specifically, locating relatively medium to large sized refrigerant leaks in closed refrigerant systems such as, for example, air conditioning systems and the like.

BACKGROUND OF THE INVENTION

Components of heating, ventilation, and air conditioning (HVAC) systems such as automotive, commercial, and residential air conditioners frequently develop refrigerant leaks which are sometimes difficult to locate or are not accessible without disassembling all or part of the HVAC system. The same is true for commercial refrigerators and freezers. The refrigerant leaks affect performance of the systems and eventually results failure of the system to cool as desired.

Several methods are known for locating refrigerant links in closed or sealed refrigerant systems which range from visual indicators to electronic sensors. One visual indicator is the use of fluorescent dyes that are visible in ultraviolet light. The fluorescent dye is added to the refrigerant within the system and then an ultraviolet light is used to look for the dye on the exterior of components of the system which indicates a leak. This method is often used in automotive air conditioning systems. While this method is often effective, it is relatively expensive due to the recurring cost of the florescent dye and the loss of refrigerant.

Another visual indicator is the use of nitrogen which appears as white smoke when it exits and hits air as it exits. This method is often used in home ore residential air conditioning systems. While this method is often effective, it is relatively expensive due to the recurring cost of the nitrogen. Additionally, the relatively low pressure of the nitrogen can make it difficult to locate some leaks.

One electronic sensor is an acoustic sensor that detects the sound of the exiting fluid. Other electronic sensors detect specific compounds such as, for example, Fluorine. While electronic sensors can be effective in selective situations, they can be relatively ineffective in other situations. Additionally, electronics sensors have a relatively high cost.

Accordingly, there exists a need for a system, method, and tool for locating refrigerant leaks that is effective and has a relatively low cost.

SUMMARY OF THE INVENTION

The present invention provides systems, methods, and tools for locating refrigerant leaks which address at least one of the above-noted problems of the related art. Disclosed herein is a tool for connecting an air hose of a source of compressed air to a low pressure service port valve of a closed refrigerant system for pressurizing the closed refrigerant system with air to locate a refrigerant leak within the closed refrigerant system. The tool comprises a connector having an inlet and an outlet, an air pressure regulator having an inlet, an outlet, a control knob for adjusting air pressure at the outlet of the air pressure regulator, and a pressure gauge for displaying air pressure at the outlet of the air pressure regulator, and an air hose fitting having an inlet for removable attachment to the air hose and an outlet in air flow communication with the inlet of the air pressure regulator. The outlet of the connector is configured for removable attachment to the low pressure service port valve for flow of compressed air from the outlet of the connector into the low pressure service port valve. The outlet of the air pressure regulator is in air flow communication with the inlet of the connector.

Also disclosed herein is a system for pressurizing a closed refrigerant system having a low pressure service port valve with air to locate a refrigerant leak within the closed refrigerant system. The system comprises a source of compressed air having an outlet, an air hose having an inlet and an outlet, and a tool removably connecting the outlet of the air hose to the low pressure service port valve of the closed refrigerant system. The inlet of the air hose is in air flow communication with the outlet of the source of compressed air. The tool comprises a connector having an inlet and an outlet, an air pressure regulator having an inlet, an outlet, a control knob for adjusting air pressure at the outlet of the air pressure regulator, and a pressure gauge for displaying air pressure at the outlet of the air pressure regulator, and an air hose fitting having an inlet removably attached to the air hose and an outlet in air flow communication with the inlet of the air pressure regulator. The outlet of the connector is configured for removable attachment to the low pressure service port valve for flow of compressed air from the outlet of the connector into the low pressure service port valve. The outlet of the air pressure regulator is in air flow communication with the inlet of the connector.

Also disclosed herein is a method for locating a refrigerant leak within a closed refrigerant system having a low pressure service port valve. The method comprises the steps of temporarily connecting an outlet of an air hose of a source of compressed air to the low pressure service port valve with a tool, and pressurizing the closed refrigerant system with compressed air so that leaks become readily apparent by escaping compressed air. The tool comprises a connector having an inlet and an outlet, an air pressure regulator having an inlet, an outlet, a control knob for adjusting air pressure at the outlet of the air pressure regulator, and a pressure gauge for displaying air pressure at the outlet of the air pressure regulator, and an air hose fitting having an inlet removably attached to the air hose and an outlet in air flow communication with the inlet of the air pressure regulator. The outlet of the connector is removably attached to the low pressure service port valve for flow of compressed air from the outlet of the connector into the low pressure service port valve. The outlet of the air pressure regulator is in air flow communication with the inlet of the connector.

From the foregoing disclosure and the following more detailed description of the various preferred embodiments it will be apparent to those skilled in the art that the present invention provides a significant advance in the technology and art of systems, methods and tools for locating refrigerant leaks in refrigerant systems. Particularly, significant in this regard is the potential the invention affords for locating refrigerant leaks in a relatively inexpensive and quick manner without creating a mess such as created when using refrigerant dye. Additional features and advantages of the invention will be better understood in view of the detailed description provided below.

BRIEF DESCRIPTION OF THE DRAWINGS

These and further advantages of the invention will become apparent from the following detailed description.

It should be understood that the appended drawings are not necessarily to scale, presenting a somewhat simplified representation of various preferred features illustrative of the basic principles of the invention. The specific design features of the various leak locating tools and systems as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the tools illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the personal temperature regulating devices disclosed herein. The following detailed discussion of various alternative and preferred embodiments will illustrate the general principles of the invention with regard to the specific application of locating leaks in a sealed or closed refrigerant system of a motor vehicle air conditioning system. Other embodiments suitable for other applications will be apparent to those skilled in the art given the benefit of this disclosure such as for example, commercial and residential air conditioning systems, commercial refrigerators and freezers, and the like.

Figure 1:
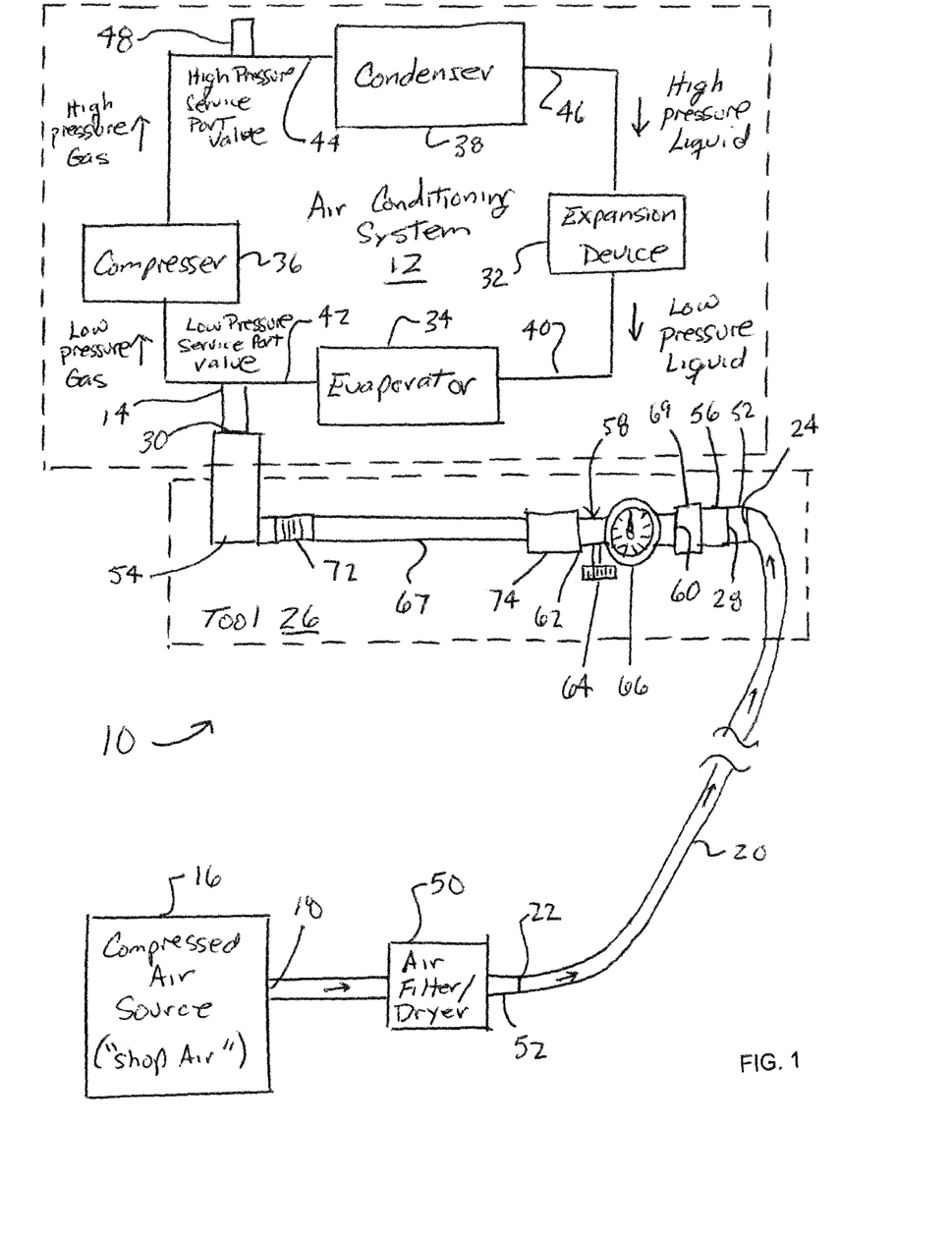
FIG. 1 is a diagrammatic view of a system for locating a refrigerant leak according to a first embodiment of the present invention which is connected to a closed or sealed refrigerant system such as, but not limited to, an air conditioning system.
Figure 2:
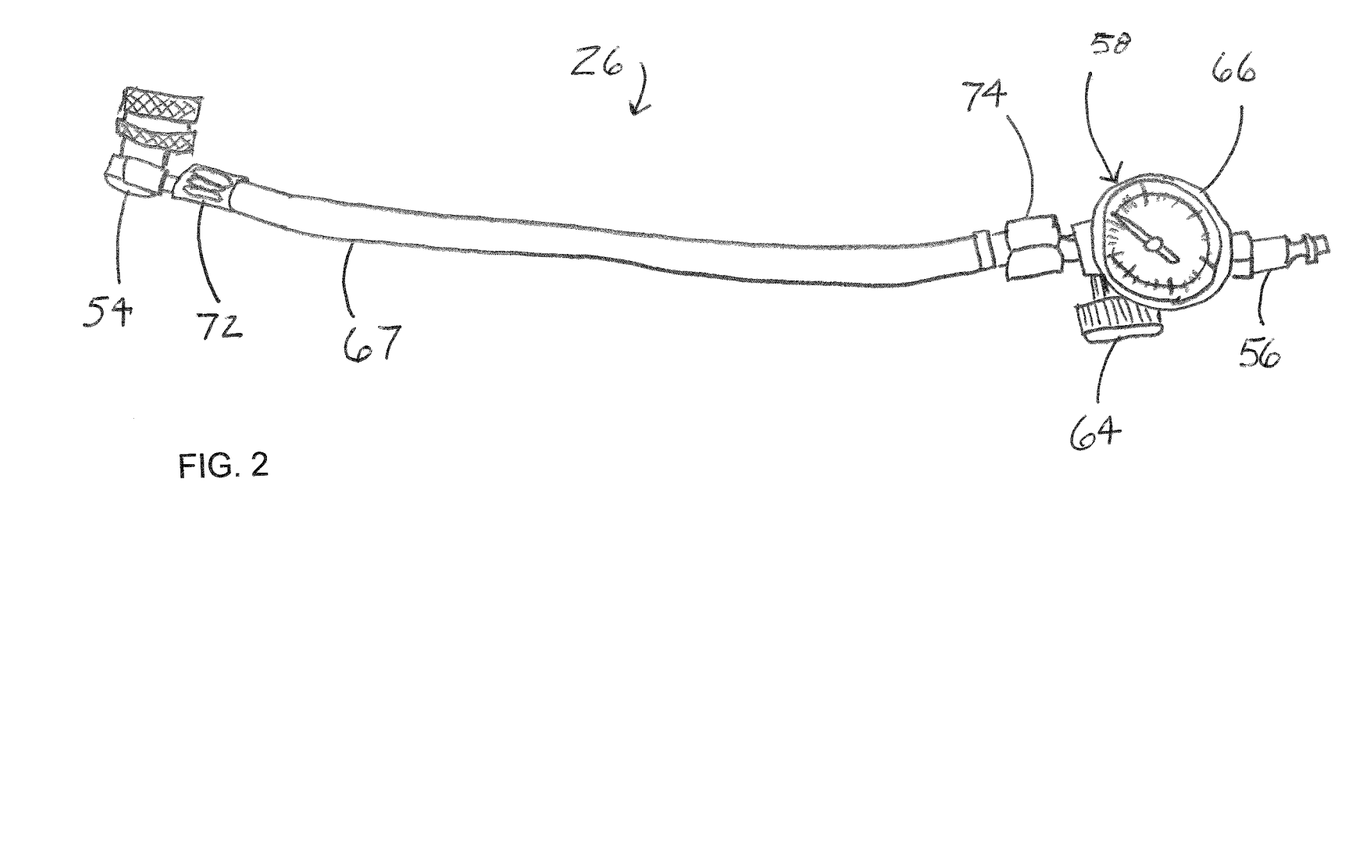
FIG. 2 is a top plan view of a tool of the system of FIG. 1.
Figure 3:
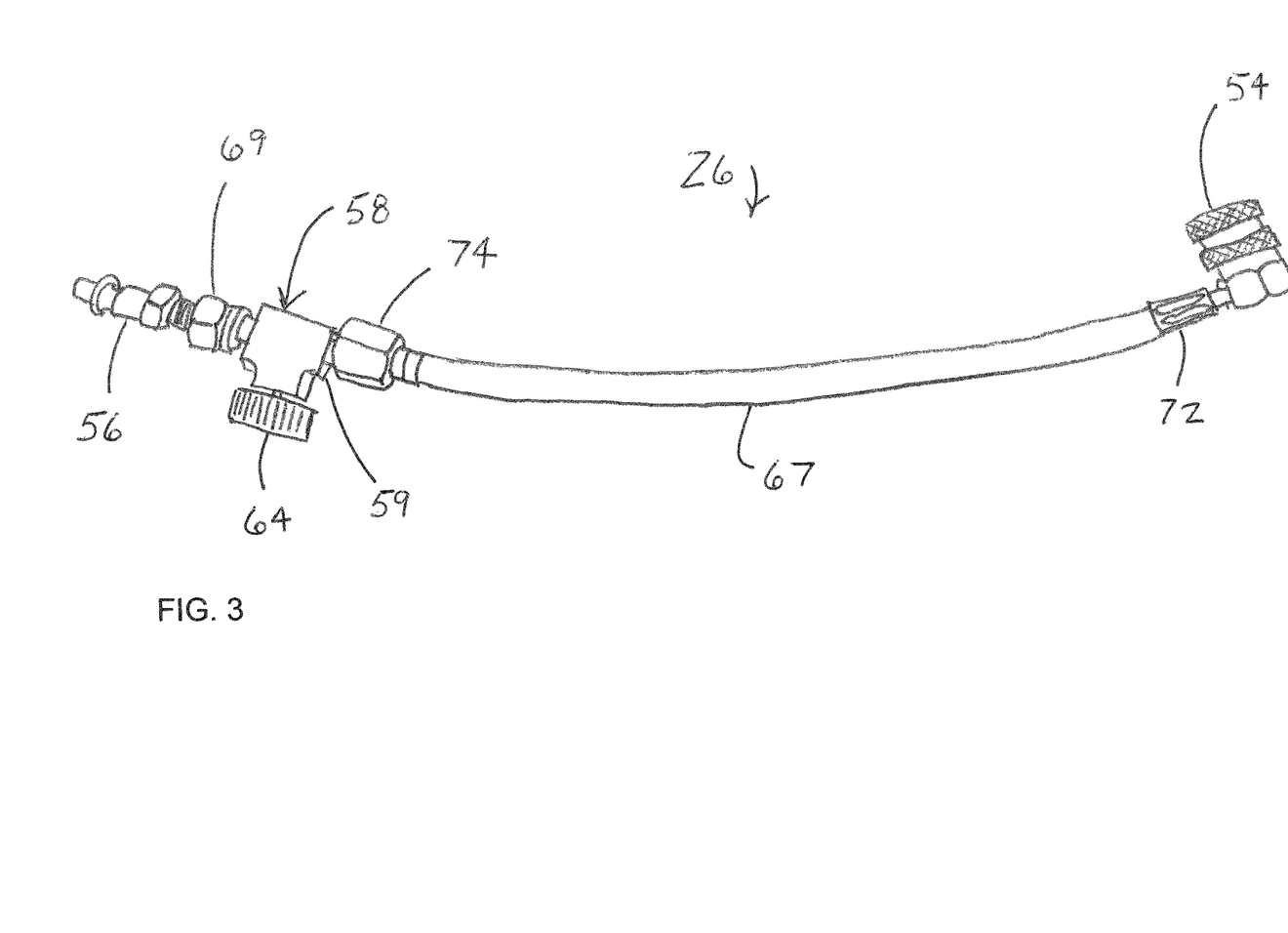
FIG. 3 is a bottom plan view of the tool of FIG. 2.
Figure 4:
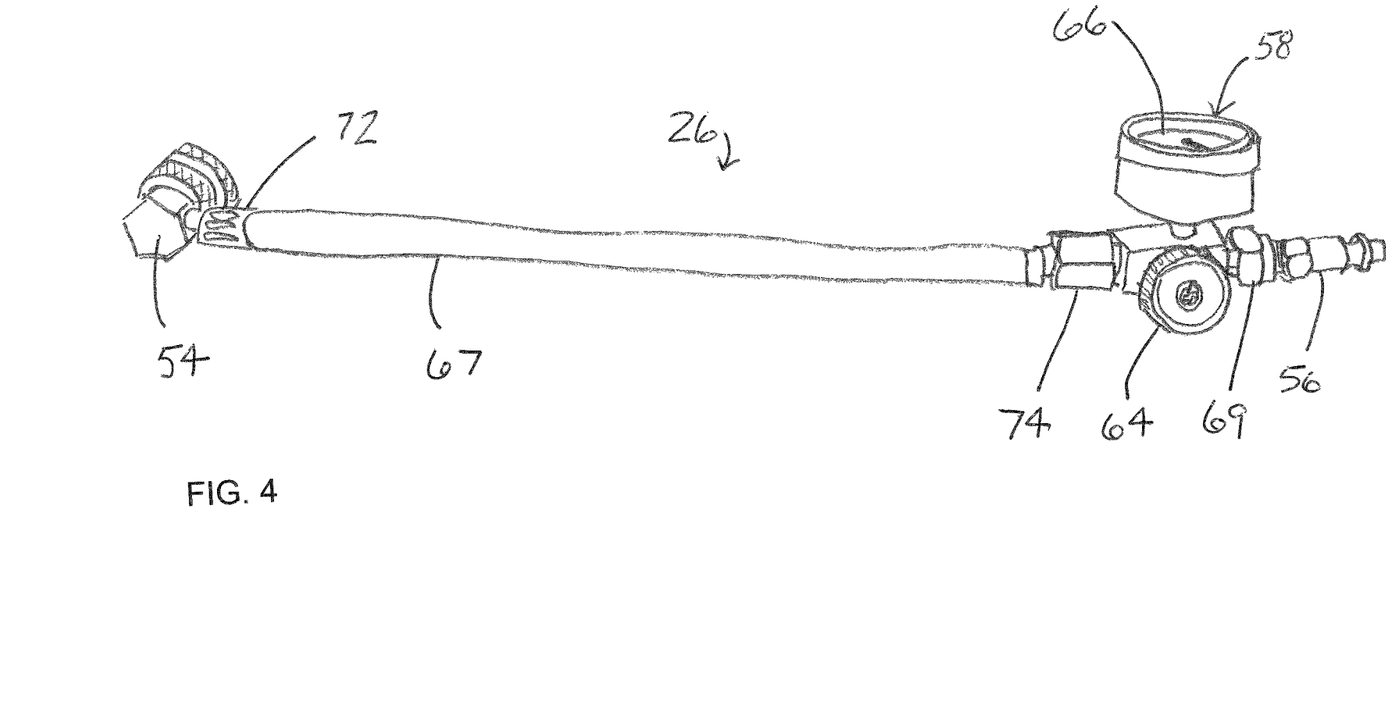
FIG. 4 is a right side elevational view of the tool of FIGS. 2 and 3.
Figure 5:
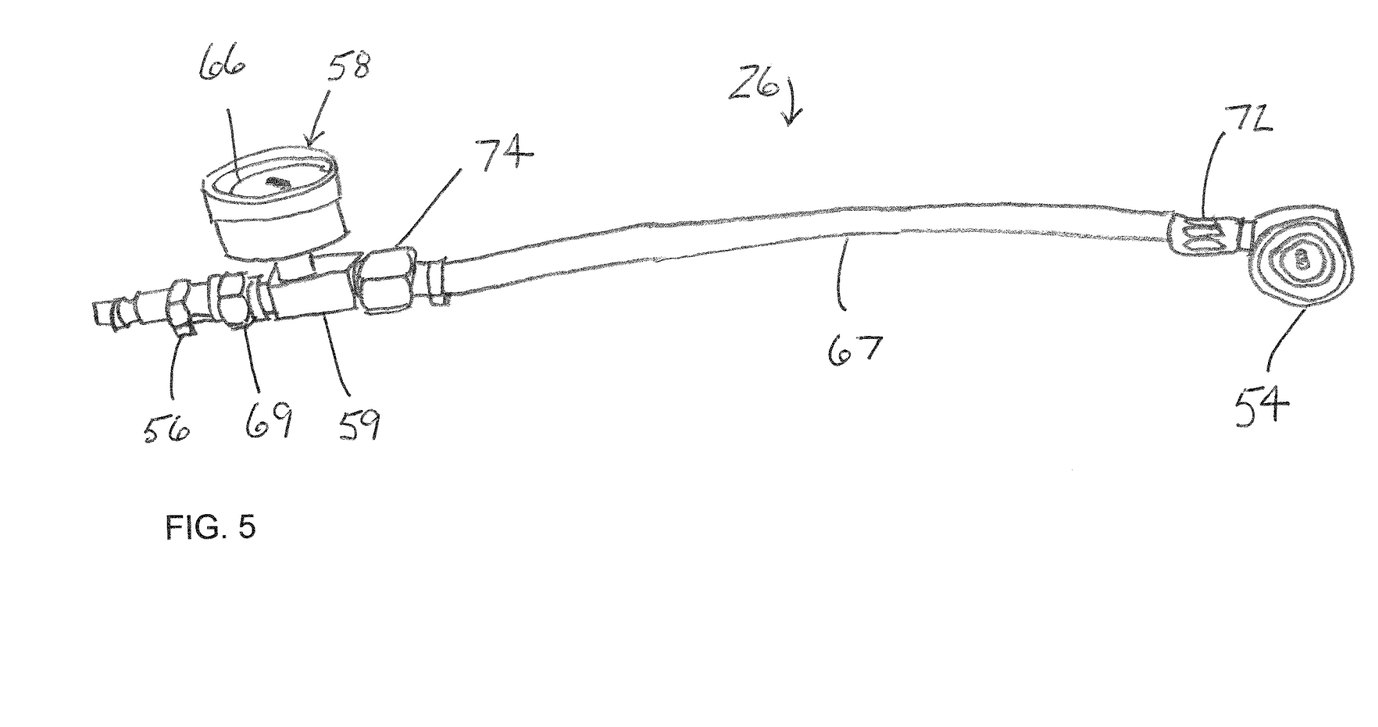
FIG. 5 is a left side elevational view of the tool of FIGS. 2 to 4.

FIG. 1 illustrates a system (10) for pressurizing a sealed or closed refrigerant system (12) having a low pressure service port valve (14) with air to locate a refrigerant leak within the sealed or closed refrigerant system (12) according to a first embodiment of the present invention. The illustrated system (10) includes a source of compressed air (16) having an outlet (18), an air hose (20) having an inlet (22) and an outlet (24), and a tool (26) removably connecting the outlet (24) of the air hose (20) to the low pressure service port valve (14) of the closed refrigerant system (12). The inlet (22) of the air hose (20) is in air flow communication with the outlet (18) of the compressed air source (16) to communicate compressed air from the outlet (18) of the compressed air source (16) to the inlet (28) of the tool (26) through an internal passage. The inlet (28) of the tool (26) is in air flow communication with the outlet (30) of the tool (26) to communicate compressed air from the outlet (24) of the air hose (20) to the low pressure service port valve (14) of the closed refrigerant system (12).

The illustrated closed refrigerant system (12) is an air conditioning system but it can alternatively be any other suitable type of closed refrigerant system (12). The illustrated mechanical air conditioning system in the form of a vapor-compression refrigeration system but any other suitable type can alternatively be utilized. The illustrated vapor-compression refrigeration system utilizes a refrigerant for the removal of unwanted heat. The refrigerant is a chemical compound that is alternately compressed and condensed into a liquid and then permitted to expand into a vapor or gas as it is pumped through the closed system (12) in order to remove heat from air which is to be cooled.

The illustrated vapor-compression refrigeration system (12) includes an expansion or metering device (32), an evaporator or cooling coil (34), a compressor (36), and a condenser (38). The metering device (32) can be a thermal expansion valve, capillary tube, or any other device that suitably controls flow of refrigerant into the evaporator (34). The metering device (32) delivers the refrigerant through a refrigerant line (40) to the refrigerant inlet of the evaporator (34) in liquid form at low pressure and low temperature. The refrigerant enters the evaporator refrigerant inlet and passes through the evaporator (34) through a refrigerant conduit or coil that is in thermal transfer relation with air to be cooled. The refrigerant expands and evaporates as it passes through the evaporator (34) to remove heat from the air to lower the temperature of the air. Heat travels from the warmer substance (the air) to the colder substance (the refrigerant) within the evaporator (34) causing the refrigerant to evaporate into a vapor. The low pressure, low temperature refrigerant vapor exits the evaporator (34) through a refrigerant outlet and is pulled through a refrigerant suction line (42) connecting the refrigerant outlet of the evaporator (34) with a refrigerant inlet of the compressor (36). The compressor (36) compresses the low pressure, low temperature refrigerant vapor into a high temperature, high pressure vapor. The compressor of a motor vehicle air conditioning system is typically mechanically driven by the vehicle engine. The high pressure, high temperature refrigerant vapor exiting the compressor (36) is pushed through a discharge line (44) connecting the outlet of the compressor (36) with an inlet of the condenser (38). The illustrated condenser (38) is an air-cooled condenser but any other suitable type of condenser such as, for example, a water-cooled condenser or the like can alternatively be utilized. The illustrated condenser (38) is provided with a fan or blower which blows air over cooling fins of the condenser (38). Within the condenser (38), the high pressure, high temperature refrigerant vapor gives up the heat gained in the evaporator (34) to the cooler air flowing over the condenser (38). As heat is removed from the refrigerant vapor within the condenser (38), the refrigerant vapor is condensed back into a high pressure, high temperature refrigerant liquid. The high pressure, high temperature refrigerant liquid exiting an outlet of the condenser (38) is pushed through a liquid line (46) into an inlet of the metering device (32). Within the metering device (32), the high pressure, high temperature refrigerant liquid passes through a small opening or orifice where a drop in pressure and temperature occurs. The low pressure, low temperature refrigerant liquid passes into the relatively larger refrigerant inlet of the evaporator (34) where it expands and vaporizes to start another cycle through the closed refrigerant system (12). While the illustrated metering device (32) can be connected to the evaporator (34) with the liquid line (46), it is noted that the metering device (32) can alternatively be incorporated directly into the evaporator (34).

The illustrated closed refrigerant system (12) also has a low pressure service port valve (14) and a high pressure service port valve (48) The illustrated low pressure service port valve (14) is located in the refrigerant line (40) between the evaporator (34) and the compressor (36) where the refrigerant is a low pressure gas. The illustrated high pressure service port valve (48) is located in the suction line (42) between the compressor (36) and the condenser (38) where the refrigerant is a high pressure gas. The illustrated service port valves (14, 48) are each a Schrader valve having a stem that is automatically depressed to open the valve when a connection is made to the port but it is noted that any other suitable type of service port valve can alternatively be utilized such as, for example but limited to, manual stem valves and the like.

The compressed air source (16) can be of any suitable type. For example, standard shop air in an auto repair shop can be provided by an air compressor. The illustrated compressed air source (16) is provided with an air filter/dryer (50) to reduce and preferably eliminate moisture or water vapor from the compressed air to prevent the moisture or water vapor from entering the closed refrigerant system (12). The air filter/dryer (50) can be of any suitable type.

The air hose (20) can be of any suitable type for passage of compressed air from the compressed air source (16) to the inlet (28) of the tool (26). The air hose (20) preferably is suitable for compressed air having a pressure of at least 200 psi. The air hose (20) is preferable a flexible tube comprised of rubber, polypropylene, or the like. First and second ends of the illustrated air hose (20) are each provided with a quick-disconnect coupler sleeve or socket (52) that cooperates with a quick-disconnect coupler nipple or plug, of the source of compressed air (16) and the tool (26) respectively, to form a quick-disconnect connection or coupling therebetween. The quick-disconnect coupling is such that the coupler nipple or plug is simply pushed into the coupler sleeve or socket until it snaps therein in order to connect the coupler parts together and the hoses are both pushed toward the coupling while at the same time pulling back the spring-loaded coupler sleeve or socket to disconnect the coupler parts. When coupled, the compressed air flows through the coupling parts but when disconnected, the flow of compressed air from the source is stopped. The air hose quick-disconnect coupling can be of any suitable type such as, for example but not limited to, the German type, the Italy type, the PCL type, the Israel type, the Milton type, the Lincoln type, the Nitto type, Aro type, the Truflate type, and the like. It is noted, however, however, any other suitable type of connector or fitting can alternatively be utilized.

The illustrated tool (26) includes a valve connector (54) at the outlet (30) of the tool (26), an air hose fitting or coupler (56) at the inlet (28) of the tool (26), and an air pressure regulator (58) located between the inlet (28) and the outlet (30) of the tool (26) for controlling the flow of compressed air through the tool (26). The valve connector (54) is configured for removable connection of the tool (26) to the low pressure service port valve (14) and flow of compressed air from the outlet (30) of the tool (26) to the low pressure service port valve (14). The air hose fitting or coupler (56) is configured for removable connection of the tool (26) to the second end (24) of the air hose (20) and flow of compressed air from the outlet (24) of the air hose (20) to the inlet (28) the tool (26). The illustrated pressure regulator (58) includes a main body (59) having an inlet (60) in fluid flow communication with the inlet (28) of the tool (26) and an outlet (62) in fluid flow communication with the outlet (30) of the tool (26), a control knob (64) extending from the main body (59) for manually adjusting air pressure at the outlet (62) of the air pressure regulator (58), and a pressure gauge (66) extending from the main body (59) for displaying the air pressure at the outlet (62) of the air pressure regulator (58).

Figure 8:
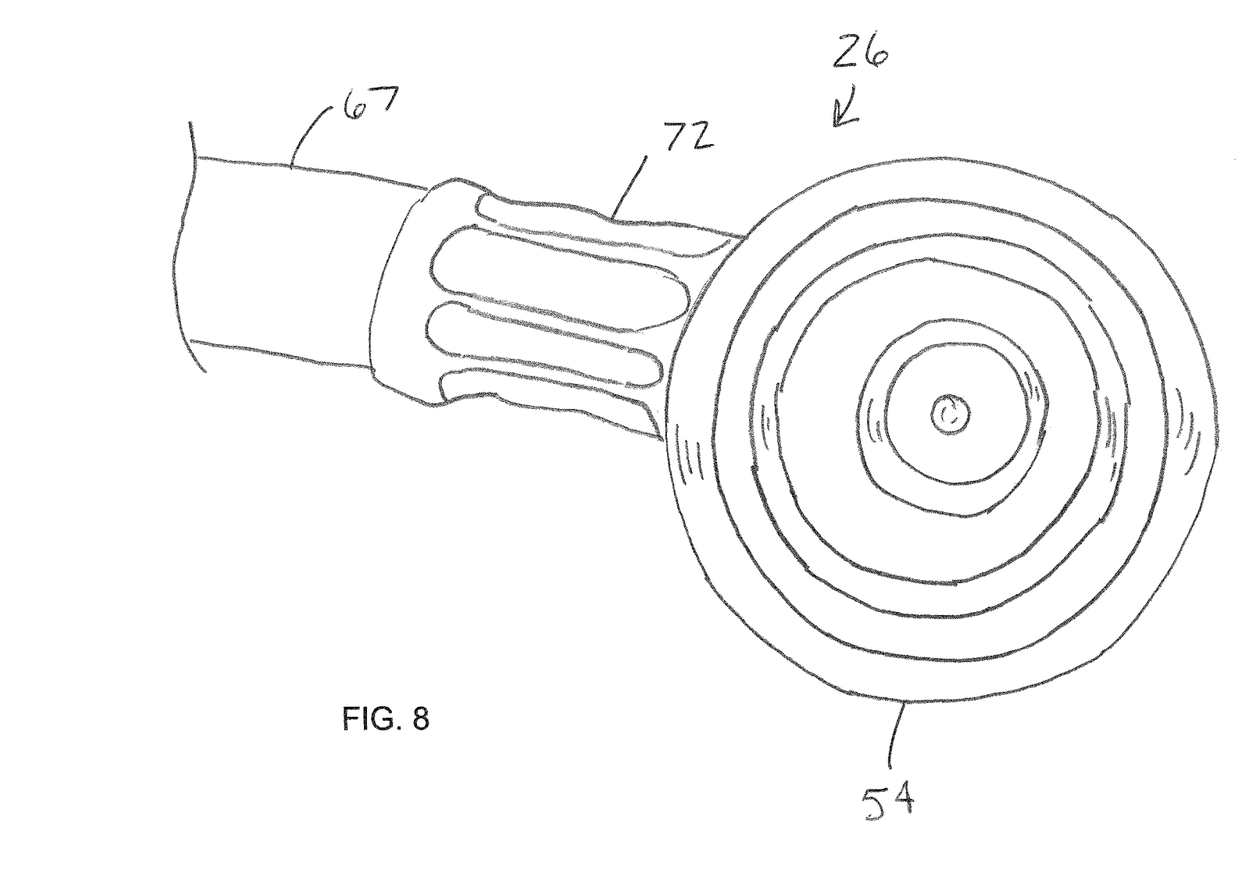
FIG. 8 is an enlarged fragmented right side elevational view showing the second or port end of the tool of FIGS. 2 to 5.

The illustrated valve connector (54) is a quick-disconnect coupler configured for removable connection with the low pressure service port valve (14) of the closed refrigerant system (12) and the flow of compressed air through the low pressure service port valve (14). Connection of the illustrated valve connector (54) automatically depresses the stem of the low pressure service port valve (14) to open the low pressure service port valve (14). It is noted that the low pressure service port valve (14) of various closed refrigerant system (12) can have many different forms so the valve connector (54) should be selected to cooperate with the specific type of low pressure service port valve (14) of the closed refrigerant system (12) that is to be serviced. The illustrated valve connector (54) is a R134A low side quick-disconnect coupler but any other suitable type of connector can be utilized such as, for example but not limited to, a R134A low side threaded coupler, a R12 low side quick-disconnect coupler, a R12 low side threaded connector, a R410A low side quick-disconnect coupler, a R410A low side threaded connector, a R22 low side quick-disconnect coupler, a R22 low side threaded connector, a R407C low side quick-disconnect coupler, a R407C low side threaded connector, and the like. The illustrated valve connector (54) is also a 90 degree connector but any other suitable configuration can be alternatively utilized. The illustrated valve connector (54) is secured to the outlet (62) of the air pressure regulator (58) with a conduit (67) having suitable connections (72, 74) at its ends for sealed connection to the valve connector (54) and the outlet of the pressure regulator (58) respectively. The connections 72, 74 can b of any suitable type. The illustrated conduit (67) is a flexible air hose but any other suitable type of conduit can alternatively be utilized. It is noted that the valve connector (54) can alternatively be connected to the outlet (62) of the air pressure regulator (58) in any other suitable manner. It is also noted that the valve connector (54) can alternatively be of any other suitable type.

The illustrated air pressure regulator (58) is a control valve that reduces the input pressure of compressed air at the pressure regulator's inlet (60) to a desired value at the pressure regulator's outlet (62). The pressure regulator's primary function is to match the flow of air through the air pressure regulator (58) to the demand for air placed upon it, while maintaining a constant output pressure. If the load flow decreases, then the regulator flow must also decrease. If the load flow increases, then the regulator flow must increase in order to keep the controlled pressure from decreasing due to a shortage of air in the pressure system. The air pressure regulator (58) typically includes a restricting element, a loading element, and a measuring element. The restricting element is a valve that can provide a variable restriction to the flow, such as a globe valve, butterfly valve, poppet valve, etc. The loading element is a part that can apply the needed force to the restricting element. This loading can be provided by a weight, a spring, a piston actuator, or a diaphragm actuator in combination with a spring. The measuring element functions to determine when the inlet flow is equal to the outlet flow. The diaphragm itself is often used as a measuring element.

In a single-stage air pressure regulator, a force balance can be used on the diaphragm to control a poppet valve in order to regulate pressure. With no inlet pressure, the spring above the diaphragm pushes the diaphragm down on the poppet valve, holding it open. Once inlet pressure is introduced, the open poppet allows flow to the diaphragm and pressure in the upper chamber increases, until the diaphragm is pushed upward against the spring, causing the poppet to reduce flow, finally stopping further increase of pressure. By adjusting the top screw, the downward pressure on the diaphragm can be increased, requiring more pressure in the upper chamber to maintain equilibrium. In this way, the outlet pressure of the air pressure regulator (58) is controlled. The operator can obtain a desired output pressure by manually rotating the control knob (64) to adjust the control knob (64) until the desired output pressure is obtained as indicated by the pressure. It is noted that the illustrated pressure gauge (66) can be of any suitable type. It is also noted that the air pressure regulator (58) can be of any suitable type.

Figure 6:
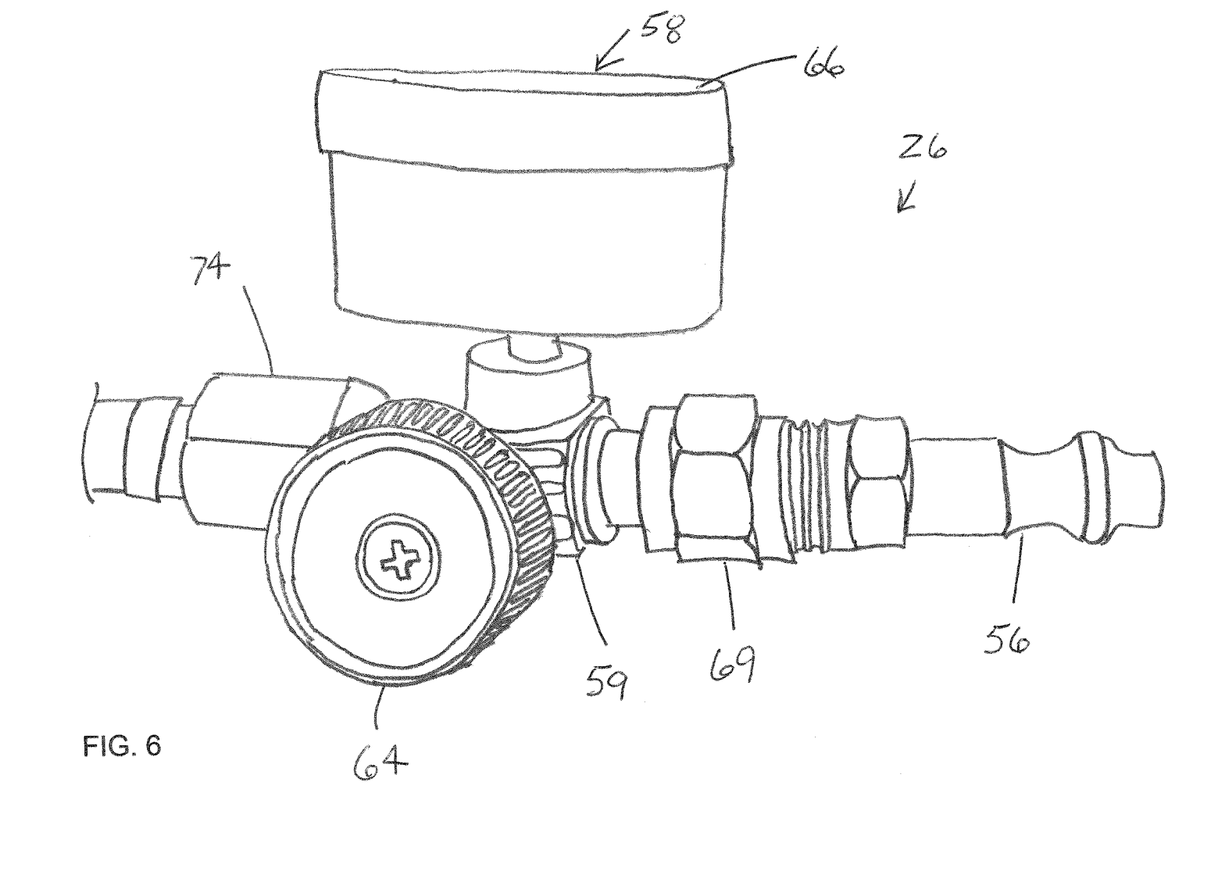
FIG. 6 is an enlarged fragmented left side elevational view showing the first or air hose end of the tool of FIGS. 2 to 5.
Figure 7:
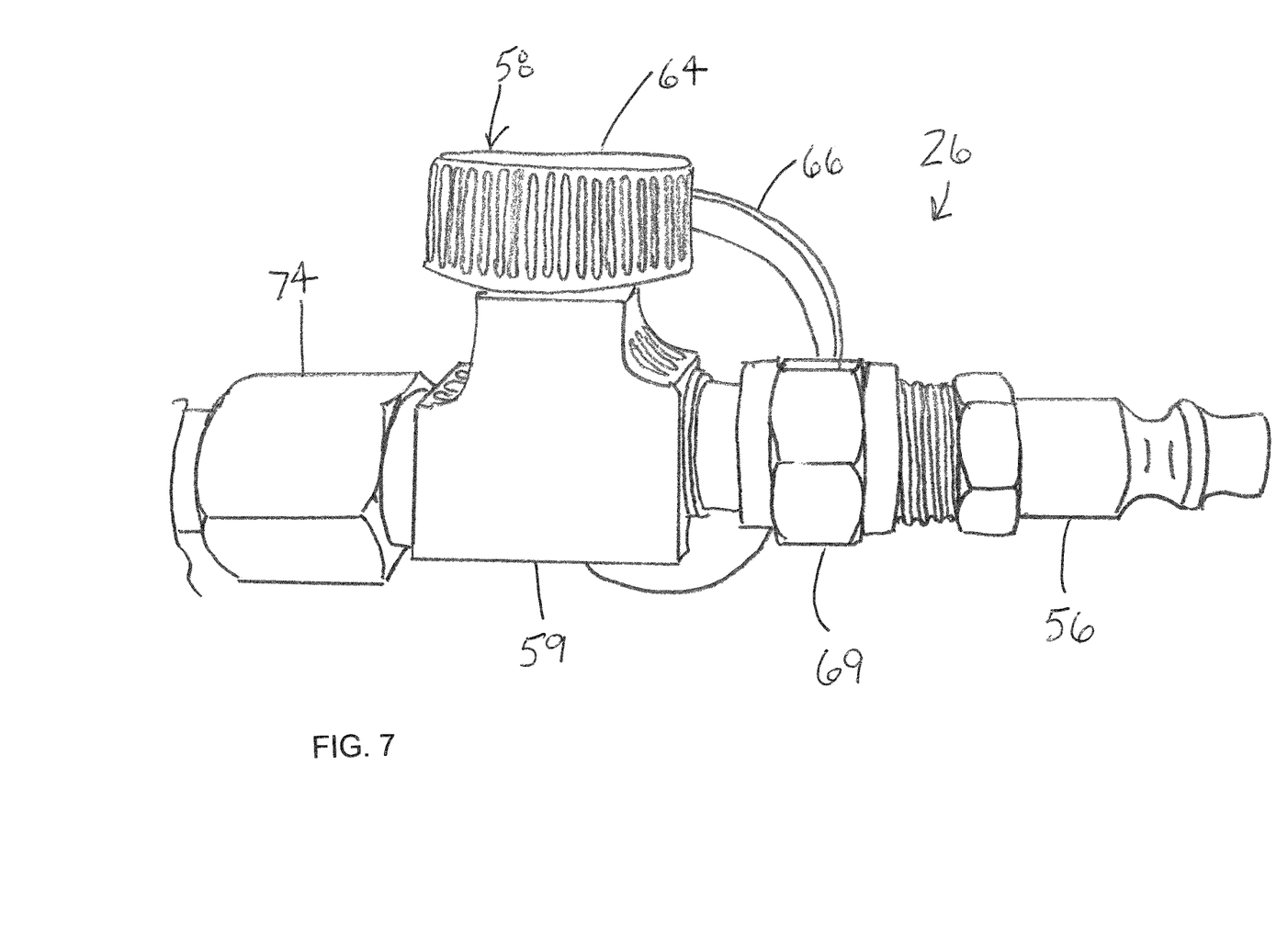
FIG. 7 is an enlarged fragmented bottom elevational view showing the first or air hose end of the tool of FIGS. 2 to 6.

The illustrated air hose fitting (56) is a quick disconnect coupler nipple or plug that cooperates with the quick-disconnect coupler sleeve (52) on the second end (24) of the air hose (20) so that that the second end of air hose (20) can be quickly connected to and disconnected from the air hose fitting (56) on the first end of the tool (26). The illustrated air hose fitting (56) is a male nipple or plug that has an outlet end with threads that threads into a threaded adapter (69) that is in turn threaded onto the inlet (60) of the air pressure regulator (58) to securely connect the air hose fitting (56) to the inlet (60) of the air pressure regulator (58). It is noted, however, that the air hose fitting (56) can alternatively be connected to the inlet (60) of the air pressure regulator (58) in any other suitable manner. It is also noted that the air hose fitting (56) can alternatively be of any other suitable type.

To locate a refrigerant leak in the closed refrigerant system (12), the refrigerant is first drained from the closed refrigerant system (12) if any refrigerant remains prior to starting. The quick disconnect coupler sleeve (52) on the second end of the air hose (20) is secured to the air hose fitting (56) on the first end of the tool (26) to connect the compressed air source (16) to the tool (26). The control knob (64) of the air pressure regulator (58) is adjusted as necessary to prevent the flow of air there through. The valve connector (54) at the outlet (30) of the tool (26) is then connected to the low pressure service port valve (14) of the closed refrigerant system (12) and the low pressure service port valve (14) automatically opens. The control knob (64) of the air pressure regulator (58) can be adjusted as necessary to obtain the desired outlet pressure as indicated on the pressure gauge (66) to pressurize the closed refrigerant system (12) with compressed air. The pressure can initially be relatively low and increased as needed to a maximum of about 200 psi in order to locate any leaks. Leaks can be located by listening for the high pressure air leaking out. Large leaks are relatively easy to hear and locate at a relatively low pressure of the compressed air. However, small leaks may require a relatively high pressure of the compressed air. Additionally, small leaks may require soapy water to be placed on the exterior of the components of the closed refrigerant system (12). When the high pressure air leaks into the soapy water, bubbles are formed to provide a visual indication of the leak location in addition to the sound of the leaking high pressure air. Once all of the leaks have been located, the tool (26) is removed from the low pressure service port valve (14) of the closed refrigerant system (12). The located leaks can then be repaired and the refrigerant can be replaced.

Figure 9:
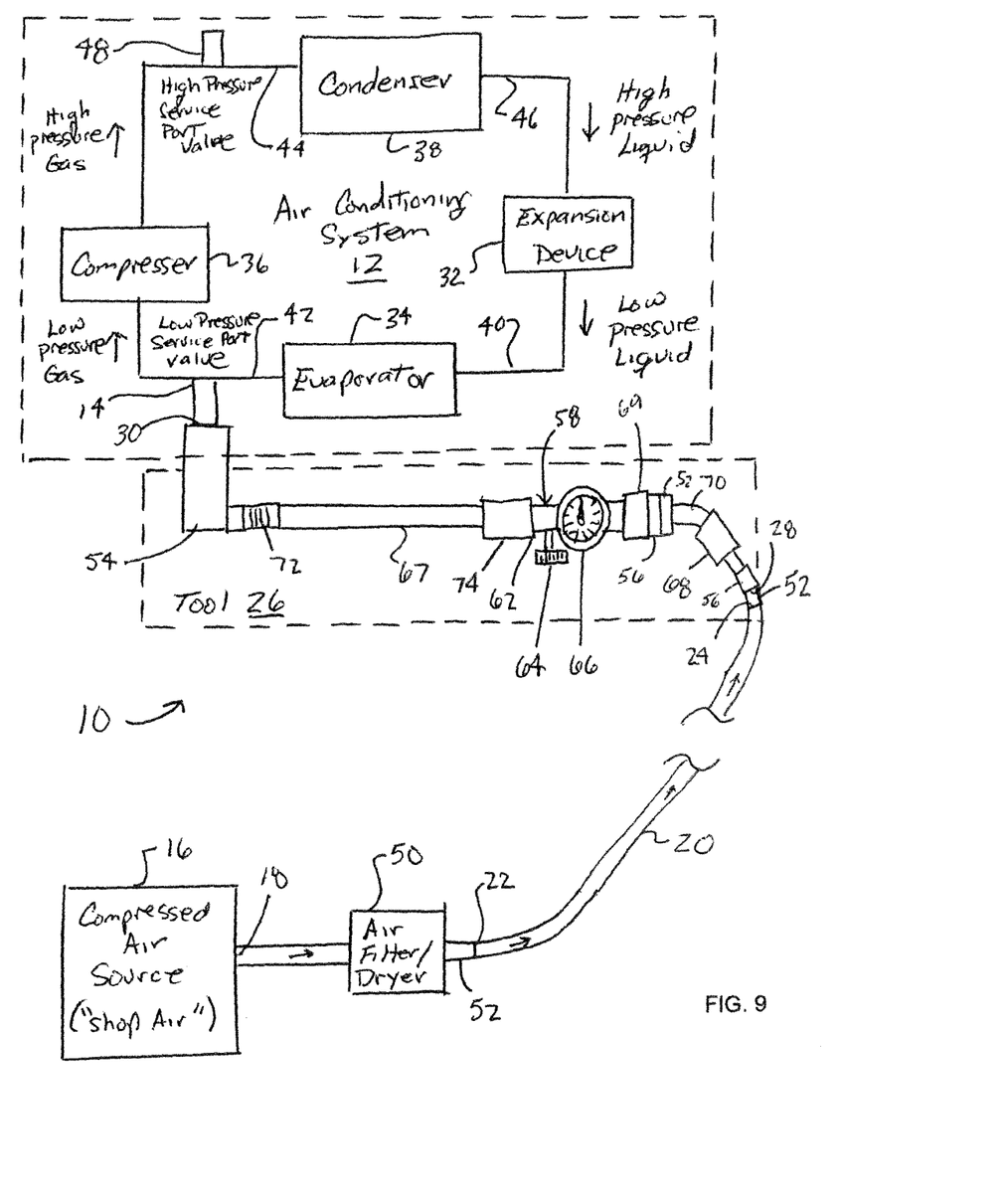
FIG. 9 is a diagrammatic view of a system for locating a refrigerant leak according to a second embodiment of the present invention which is connected to a closed or sealed refrigerant system such as, but not limited to, an air conditioning system.

FIG. 9 illustrates a system (100) for pressurizing a closed refrigerant system (12) having a low pressure service port valve (14) with air to locate a refrigerant leak within the closed refrigerant system (12) according to a second embodiment of the present invention. The system (100) according to the second embodiment of the invention is substantially the same as the system (10) according to the first embodiment of the invention disclosed in detail above except that the tool (26) includes an in-line desiccant dryer (68). The illustrated in-line desiccant dryer (68) is located in a conduit (70) connecting the outlet of the air hose fitting (56) and the inlet (60) of the air pressure regulator (58) so that air passing through the tool (26) is dried to remove moisture or water vapor before reaching the closed refrigerant system (12). The illustrated conduit (70) has connections in the form of quick disconnect couplings (52, 56) with the air hose (20) and the pressure regulator (58) but any other suitable connections can alternatively be utilized. The illustrated conduit (70) is a flexible air hose but any other suitable type of conduit can alternatively be utilized. Alternatively, the in-line desiccant dryer can be located in the conduit (67) located between the outlet (62) of the air pressure regulator (58) and the valve connector (54) or any other suitable location. The in-line desiccant dryer (68) is preferably of the replaceable or disposable type so that can be replaced when no longer effective. However, the in-line desiccant dryer can alternatively be of any other suitable type. It is noted that the in-line desiccant dryer (68) can be used instead of or in addition to the air filter/dryer (50) located at the compressed air source (16).

It is noted that each of the features of the various disclosed embodiments of the present invention can be utilized in any combination with each of the other disclosed embodiments of the present invention.

From the above disclosure it can be appreciated that the systems, methods, and tools according to the present invention are effective, have a relatively low cost, and are easy to use/perform.

The preferred embodiments of this invention can be achieved by many techniques and methods known to persons who are skilled in this field. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention.

What is claimed is:

1. A tool for connecting an air hose of a source of compressed air to a low pressure service port valve of a closed refrigerant system for pressurizing the closed refrigerant system with dry compressed air to locate a refrigerant leak within in the closed refrigerant system, the tool comprising:
   a connector having an inlet and an outlet;
   wherein the outlet of the connector is configured for removable attachment to the low pressure service port valve for flow of dry compressed air from the outlet of the connector into the low pressure service port valve;
   an air pressure regulator having an inlet, an outlet, a control knob for adjusting air pressure at the outlet of the air pressure regulator, and a pressure gauge for displaying air pressure at the outlet of the air pressure regulator;
   wherein the air pressure regulator is a control valve that reduces the input pressure of dry compressed air to a desired value at the output of the pressure regulator;
   a first conduit extending between an outlet of the air pressure regulator to the inlet of the connector to provide air flow communication between the outlet of the air pressure regulator and the inlet of the connector;
   an air hose fitting having an inlet for removable attachment to the air hose and an outlet in air flow communication with the inlet of the air pressure regulator; and
   wherein a connection between the outlet of the air hose fitting and the inlet of air pressure regulator is one of (a) the air hose fitting attached to the air pressure regulator to provide air flow communication between the outlet of the air hose fitting and the inlet of the air pressure regulator and (b) a second conduit secured to the air hose fitting and the air pressure regulator to provide air flow communication between the outlet of the air hose fitting and the inlet of the air pressure regulator.

2. The tool according to claim 1, wherein the connector is a quick disconnect coupler.

3. The tool according to claim 1, wherein the connector is a threaded coupler.

4. The tool according to claim 1, wherein the first conduit is a flexible hose.

5. The tool according to claim 1, further comprising an in-line desiccant compressed air dryer located along the second conduit.

6. The tool according to claim 1, wherein the second conduit is secured to at least one of the air hose fitting and the air pressure regulator with a quick disconnect coupling.

7. The tool according to claim 6, further comprising an in-line desiccant compressed air dryer located along the second conduit.

8. A system for pressurizing a closed refrigerant system having a low pressure service port valve with dry compressed air to locate a refrigerant leak within the closed refrigerant system, the system comprising:
   a source of compressed air having an outlet;
   an air hose having an inlet and an outlet,
   wherein the inlet of the air hose is in air flow communication with the outlet of the source of compressed air; and
   a tool removably connecting the outlet of the air hose to the low pressure service port valve of the closed refrigerant system;
   wherein the tool comprises:
     a connector having an inlet and an outlet,
     wherein the outlet of the connector is configured for removable attachment to the low pressure service port valve for flow of dry compressed air from the outlet of the connector into the low pressure service port valve;
     an air pressure regulator having an inlet, an outlet, a control knob for adjusting air pressure at the outlet of the air pressure regulator, and a pressure gauge for displaying air pressure at the outlet of the air pressure regulator;
     wherein the air pressure regulator is a control valve that reduces the input pressure of air to a desired value at its output;
     a first conduit extending between an outlet of the air pressure regulator to the inlet of the connector to provide air flow communication between the outlet of the air pressure regulator and the inlet of the connector;
     an air hose fitting having an inlet removably attached to the air hose and an outlet in air flow communication with the inlet of the air pressure regulator; and
     wherein a connection between the outlet of the air hose fitting and the inlet of air pressure regulator is one of (a) the air hose fitting attached to the air pressure regulator to provide air flow communication between the outlet of the air hose fitting and the inlet of the air pressure regulator and (b) a second conduit secured to the air hose fitting and the air pressure regulator to provide air flow communication between the outlet of the air hose fitting and the inlet of the air pressure regulator.

9. The system according to claim 8, wherein the connector is a quick disconnect coupler.

10. The system according to claim 8, wherein the connector is a threaded coupler.

11. The system according to claim 8, wherein the first conduit is a flexible hose.

12. The system according to claim 8, wherein the tool includes an in-line desiccant compressed air dryer located along the second conduit.

13. The system according to claim 8, wherein the second conduit is secured to at least one of the air hose fitting and the air pressure regulator with a quick disconnect coupling.

14. The system according to claim 13, further comprising an in-line desiccant compressed air dryer located along the second conduit.

15. A method for locating a refrigerant leak within a closed refrigerant system having a low pressure service port valve, the method comprising the steps of:
   temporarily connecting an outlet of an air hose of a source of compressed air to the low pressure service port valve with a tool;
   wherein the tool comprises:
     a connector having an inlet and an outlet;
     wherein the outlet of the connector is removably attached to the low pressure service port valve for flow of dry compressed air from the outlet of the connector into the low pressure service port valve;
     an air pressure regulator having an inlet, an outlet, a control knob for adjusting air pressure at the outlet of the air pressure regulator, and a pressure gauge for displaying air pressure at the outlet of the air pressure regulator;

wherein the air pressure regulator is a control valve that reduces the input pressure of air to a desired value at its output;

wherein the outlet of the air pressure regulator is ina first conduit extending between an outlet of the air pressure regulator to the inlet of the connector to provide air flow communication with between the outlet of the air pressure regulator and the inlet of the connector; and an air hose fitting having an inlet removably attached to the air hose and an outlet in air flow communication with the inlet of the air pressure regulator; and wherein a connection between the outlet of the air hose fitting and the inlet of air pressure regulator is one of (a) the air hose fitting attached to the air pressure regulator to provide air flow communication between the outlet of the air hose fitting and the inlet of the air pressure regulator and (b) a second conduit secured to the air hose fitting and the air pressure regulator to provide air flow communication between the outlet of the air hose fitting and the inlet of the air pressure regulator; and pressurizing the closed refrigerant system with dry compressed air so that leaks become readily apparent by escaping compressed air.

16. The method according to claim 15, wherein the connector is a quick disconnect coupler.

17. The method according to claim 15, wherein the connector is a threaded coupler.

18. The method according to claim 15, wherein the tool further comprises an in-line desiccant compressed air dryer located along the second conduit.

19. The method according to claim 15, wherein the second conduit is secured to at least one of the air hose fitting and the air pressure regulator with a quick disconnect coupling.

20. The method according to claim 19, further comprising an in-line desiccant compressed air dryer located along the second conduit.

* * * * *